April 22, 1930.　　　J. COMISKEY　　　1,755,207
AUTOMOBILE BUMPER
Filed May 22, 1929　　2 Sheets-Sheet 2
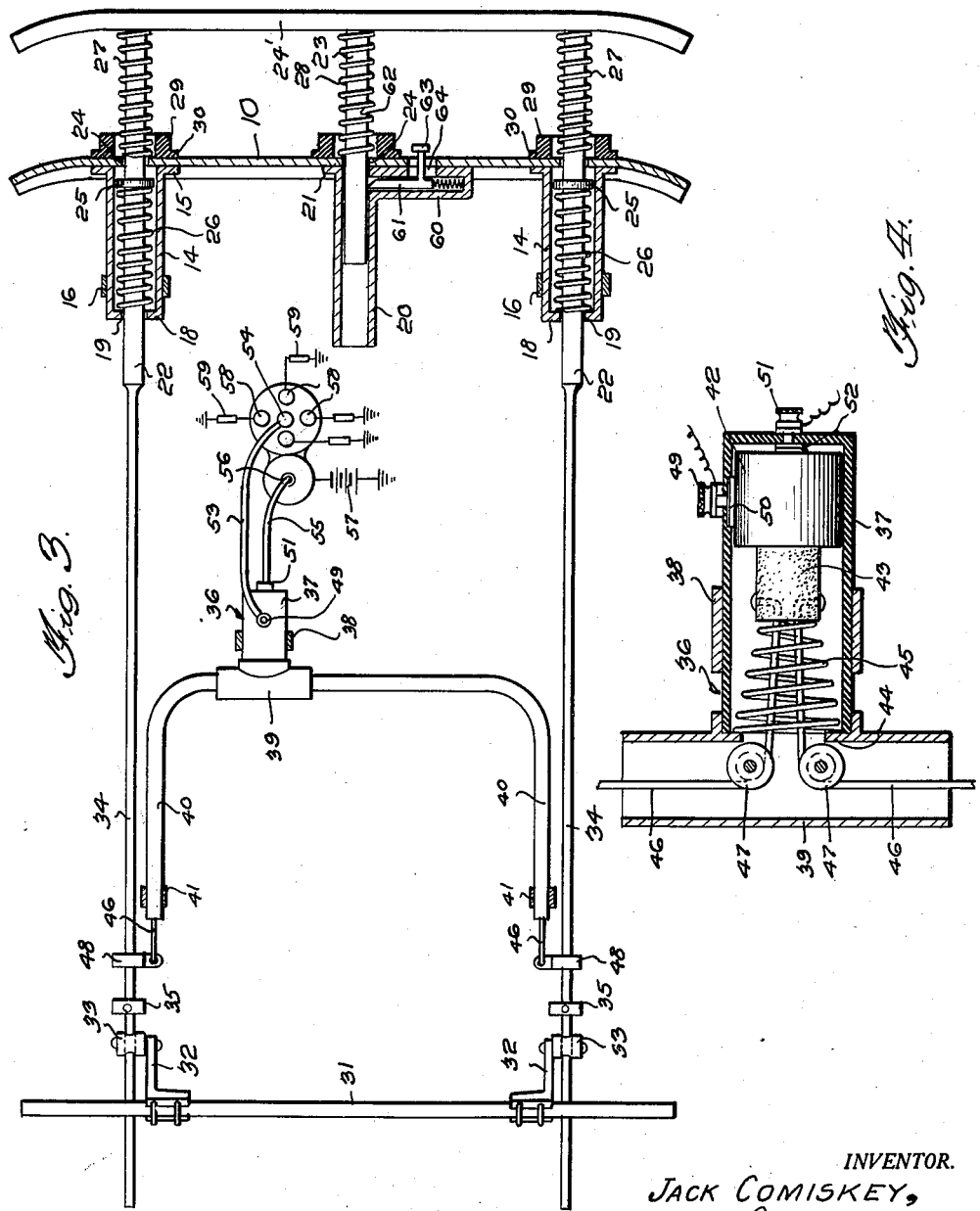
INVENTOR.
JACK COMISKEY,
BY
ATTORNEY.

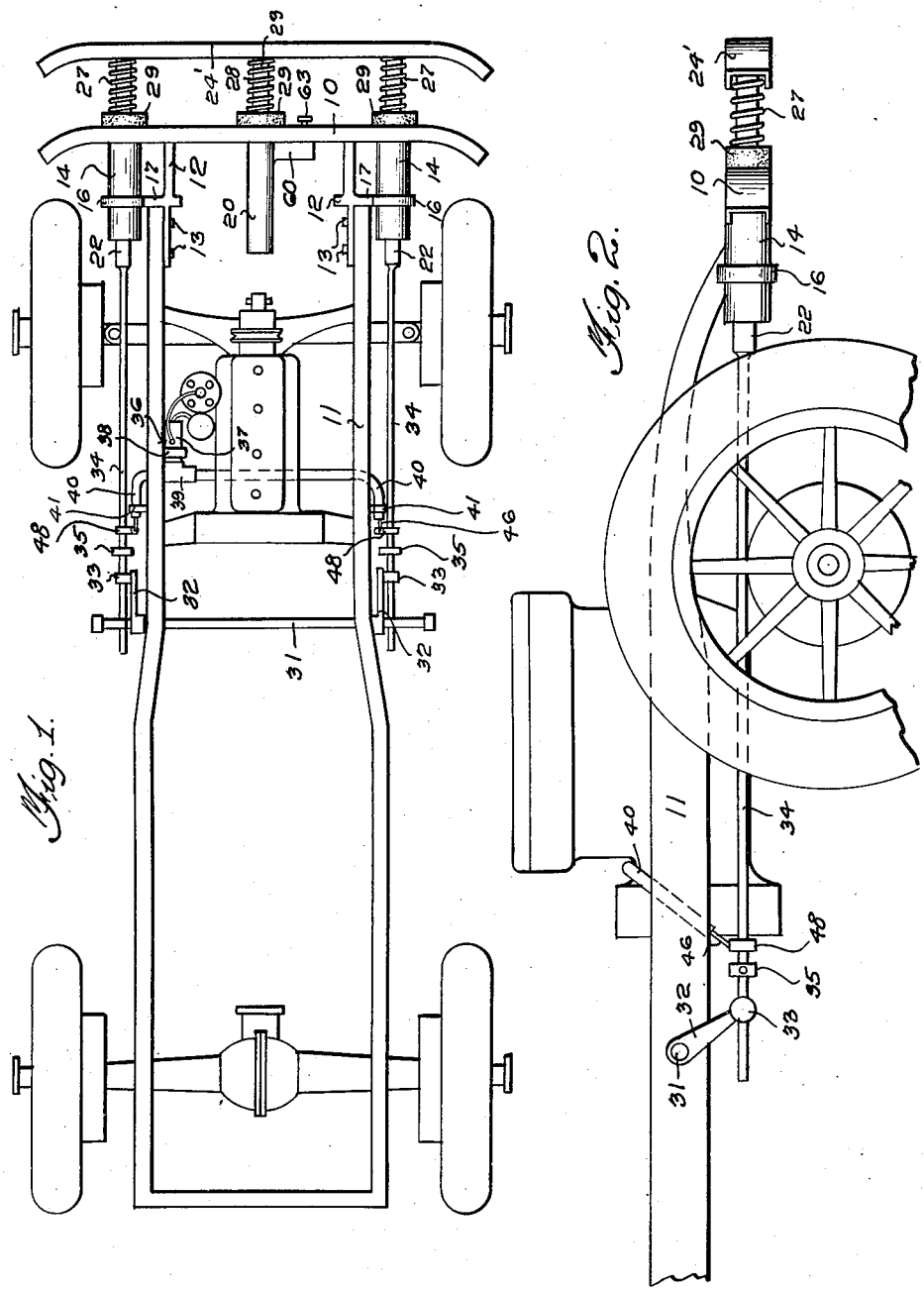

Patented Apr. 22, 1930

1,755,207

UNITED STATES PATENT OFFICE

JACK COMISKEY, OF KANSAS CITY, KANSAS

AUTOMOBILE BUMPER

Application filed May 22, 1929. Serial No. 365,196.

My invention relates to bumper actuated means for stopping a traveling automobile.

In accordance with my invention, a forward bumper is provided, having its rearward movement opposed by yielding means. When the bumper is moved rearwardly with relation to the chassis of the automobile, as when striking an object, means are provided to open the ignition circuit, and to apply brakes, thus bringing the automobile to a stop in the quickest and safest manner. Means are also preferably provided to lock the bumper element in the relative rear position when shifted thereto, thus rendering it impossible for the driver to start the automobile without manually releasing the bumper.

In the accompanying drawings, forming a part of this specification, and in which like numerals are employed to designate like parts throughout the same, Figure 1 is a plan view of apparatus embodying my invention, Figure 2 is a side elevation of the same, Figure 3 is a plan view of the bumper and associated elements, removed from the chassis, of the automobile, and, Figure 4 is a central longitudinal horizontal section through the circuit closing means, parts in elevation.

In the drawings, wherein for the purpose of illustration, is shown a preferred embodiment of my invention, the numeral 10 designates a rear bumper, which is preferably rigidly attached to the forward ends of the longitudinal chassis beams 11, by means of brackets 12, bolted to the beams 11, as shown at 13.

Arranged at the rear bumper 10, and adjacent thereto, are compression cylinders 14, having forward flanged ends 15, rigidly attached to the bumper 10 by rivets, welding or the like. These compression cylinders 14 are also held within sleeves 16, carried by arms 17, which are rigidly attached to the brackets 12, as clearly shown in Figure 1. The forward ends of the cylinders 14 are open and their rear ends have heads 18, having openings 19 formed therein, as shown.

The numeral 20 designates a locking cylinder, having a forward flanged end 21, bolted, riveted or welded to the bumper 10, and the forward and rear ends of this locking cylinder are open, as shown.

Rods 22 and 23 extend through openings 24 in the rear bumper 10, and are rigidly attached at their forward ends to a forward bumper 24. Rearwardly of the rear bumper 10, the rods 22 are provided with a plunger 25, slidable within the cylinders 14, and acting upon compressible coil springs 26, engaging the ends 19. Surrounding the rods 22, in advance of the rear bumper 10, is a compressible coil spring 27, confined between the forward bumper 24 and the rear bumper 10. Surrounding the rod 23, between the bumpers 10 and 24 is a compressible coil spring 28, as shown. The function of these several springs is to yieldingly oppose the relative rearward movement of the forward bumper.

The numeral 29 designates annular shock absorbers, preferably formed of rubber and surrounding the springs 27 and 28, and mounted upon the forward side of the rear bumper 10, and held thereon by rings 30, rigidly attached to the bumper 10. The shock absorbers 29 serve to limit the rearward movement of the forward bumper 24.

The numeral 31 designates the usual transverse rock shaft, mounted upon the chassis of the automobile, for applying the four wheel brakes, which brakes receive motion through suitable connections, upon the turning of the rock shaft. The rock shaft 31 is turned by depending cranks 32, rigidly attached thereto, and having heads 33, pivoted thereon, and these heads have openings formed therethrough slidably receiving rods 34, the forward ends of which are rigidly attached to the rods 22. The rods 34 are sufficiently resilient, to flex slightly due to the travel of the cranks 32. Stops 35 are clamped to the rods 34, and engage the heads 33, thereby turning the cranks 32.

The numeral 36 designates a switch device as a whole, for opening the ignition circuit. This switch device embodies a cylinder 37, preferably formed of fibre or other insulating material and this cylinder is held within a bracket 38, bolted to the chassis beam 11.

Secured to the rear end of the cylinder 37 is a preferably metal tubular coupling 39, arranged at a right angle thereto, and this coupling is connected with tubes 40, curved, as shown and the longitudinal arms of these tubes may be suitably supported from the beams 11 by brackets 41, Figure 1. Mounted to slide in the insulating cylinder 37 is a contact cylinder 42, formed of metal, such as brass, and this cylinder 42 has a fibre stem 43 rigidly attached to its rear end. Arranged between the stem 43 and flange 44, is a compressible coil spring 45, and cables 46 extend through this spring and are attached to the stem 43, and pass about guide pulleys 47, within the coupling 39. These cables extend rearwardly through the guide tubes 40 and are attached to brackets 48, secured to the rods 34.

A binding post 49 is mounted upon the side of the insulating cylinder 37 and carries a contact 50, disposed upon the inner side of the cylinder 37, to engage the contact cylinder 42. A binding post 51 is secured to the end of the insulating cylinder 37 and carries a contact 52 arranged upon the inner side of the cylinder to engage with the contact cylinder 42. A wire 53 is connected with the binding post 49 and with the binding post 54 of the distributor and a wire 55 is connected with the binding post 51 and the binding post 56 of the coil, as shown. It is thus seen that when the bumper 24 is in the forward position, spring 45 will retain the contact cylinder 42 in the forward position, and contacts 50 and 52 will be in electrical connection, whereby the distributor will be in electrical connection with the coil, thereby maintaining the ignition circuit closed. The spark coil has its opposite binding post connected with one side of a generator 57, the other side of which is grounded to the chassis. The several binding posts 58 of the distributor are electrically connected with electrodes of spark plugs 59, the opposite electrodes of which are grounded to the chassis, as is customary.

The numeral 60 designates a tubular guide, rigidly attached to the locking cylinder 20, and receiving a spring pressed bolt 61, to engage in a notch 62, when the rod is shifted to the rear position. The bolt 61 is retracted by a handle 63, operating in a longitudinal slot 64, and accessible from the front of the automobile.

The operation of the apparatus is as follows:

When the automobile is traveling, the forward bumper 24 is in the forward position, and the ignition circuit is closed at contacts 50 and 52, and contact cylinder 42, and the brakes are off. When the bumper 24 collides with an obstruction, it is shifted rearwardly with respect to the bumper 10 and this rearward movement is yieldingly opposed by the springs 26, 27 and 28, which also serve to yieldingly retard the travel of the automobile. This rearward movement of the bumper 24 continues until it engages the rubber shock absorbers 29, at which time the movement is yieldingly arrested. Upon the rearward movement of the bumper 24, rods 22 move rearwardly, carrying with them rods 34. The rearward movement of the rods 34 draws the cables 46 rearwardly, and moves the contact cylinder 42 rearwardly so that it disengages the contact 52, thereby opening the ignition circuit at this point. The driving action of the engine is, therefore, stopped. This occurs before stops 35 engage the heads 33, whereby the driving action of the engine is discontinued prior to the application of the brakes. When stops 35 engage heads 33, cranks 32 are swung rearwardly and the rock shaft 31 turned, and the four wheel brakes are applied, thus bringing the automobile to a stop. The rod 23 is now locked in the rearmost position and the automobile can not be started until the driver manually releases the locking rod, at which time the bumper 24 and associated elements are returned to the forward position.

It is to be understood that the form of my invention, herewith shown and described is to be taken as a preferred example of the same, and that various changes in the shape, size and arrangement of parts may be resorted to without departing from the spirit of my invention, or the scope of the subjoined claims.

Having thus described my invention, I claim:—

1. In automobile stopping means, a rear bumper, compression cylinders disposed upon the rear side of the rear bumper, near its ends and secured thereto, a forward bumper, rods secured to the forward bumper and operating within the compression cylinders, springs within the compression cylinders and serving to oppose the rearward movement of said rods, brake actuating means including a transverse rock-shaft, cranks secured to the rock-shaft near its ends and disposed near said rods, elements effecting a slidable connection between the cranks and rods, and stops mounted upon said rods and movable into engagement with said elements.

2. In automobile stopping means, a bumper, rods secured to the bumper near its ends and extending longitudinally of the automobile, yielding means to oppose the rearward movement of the bumper, a transverse rock-shaft having the rods arranged near the ends of the transverse rock-shaft, cranks secured to the rock-shaft near its ends and having slidable connections with the rods, and stops mounted upon the rods to shift said cranks.

3. In automobile stopping means, a rear bumper secured to the automobile chassis, a forward bumper, rods carrying the forward bumper and supported by the rear bumper to move longitudinally with relation thereto, yielding means arranged upon the forward side of the rear bumper to oppose the rearward movement of the forward bumper, rubber shock absorbers surrounding the yielding means and arranged upon the forward side of the rear bumper to limit the rearward movement of the forward bumper, brake actuating means operated by the movement of the rods, and means to open the ignition circuit of the engine actuated by the movement of the rods.

4. In automobile stopping means, a rear bumper secured to the automobile chassis, a forward bumper, rods carrying the forward bumper and supported by the rear bumper to move longitudinally with relation thereto, yielding means disposed upon the rear side of the rear bumper to oppose the rearward movement of the forward bumper yielding means disposed upon the front side of the rear bumper to oppose the rearward movement of the front bumper, rubber shock absorbers arranged upon the forward side of the rear bumper and surrounding the forward yielding means to limit the rearward movement of the forward bumper, and brake actuating means operated by the movement of the rods.

5. In automobile stopping means, a rear bumper having openings formed therein, compression cylinders secured to the rear side of the rear bumper adjacent to said openings, rods extending through the openings and cylinders, compressible coil springs arranged within the cylinders to oppose the rearward movement of said rods, compressible coil springs arranged in advance of the rear bumper, a forward bumper carried by the rods and acting against the last named compressible coil springs, rubber shock absorbers surrounding the rods and disposed in advance of the rear bumper to limit the rearward movement of the forward bumper, and brake applying means actuated by the movement of said rods.

6. In automobile stopping means, a bumper mounted upon the chassis of an automobile to move in a direction longitudinally of the automobile, yielding means to oppose the rearward movement of the bumper, a longitudinally movable rod connected with the bumper, igniting circuit opening means including a reciprocatory contact, a spring to move the contact to the closed position, a cable connected with the contact and with the rod, and brake actuating means operated by the rod.

7. In automobile stopping means, a bumper, longitudinal rods secured to the bumper near its ends, yielding means to oppose the rearward movement of the bumper, ignition circuit opening means including a cylinder, contacts carried thereby, a contact plunger within the cylinder, yielding means to oppose the movement of the contact plunger in one direction, cables secured to the contact plunger, guide means for the cables arranged between the rods and extending adjacent to the same, means connecting the cables with the rods, a transverse rock-shaft, cranks carried by the rock-shaft near its ends and disposed adjacent to said rods, and elements carried by the rods to actuate the cranks.

In testimony whereof I affix my signature.
JACK COMISKEY.